United States Patent
Jiang et al.

(10) Patent No.: US 10,312,813 B2
(45) Date of Patent: *Jun. 4, 2019

(54) MULTI-PHASE CONVERTER

(71) Applicant: Google LLC, Mountain View, CA (US)

(72) Inventors: Shuai Jiang, Saratoga, CA (US); Chee Yee Chung, Milpitas, CA (US); Xin Li, San Jose, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/170,452

(22) Filed: Oct. 25, 2018

(65) Prior Publication Data

US 2019/0068061 A1 Feb. 28, 2019

Related U.S. Application Data

(63) Continuation of application No. 15/675,285, filed on Aug. 11, 2017, now Pat. No. 10,141,849.

(51) Int. Cl.
*H02M 3/158* (2006.01)

(52) U.S. Cl.
CPC .. *H02M 3/1584* (2013.01); *H02M 2003/1586* (2013.01)

(58) Field of Classification Search
CPC ............... H02M 3/158; H02M 3/1584; H02M 2003/1586
See application file for complete search history.

(56) References Cited

U.S. PATENT DOCUMENTS

| | | |
|---|---|---|
| 6,803,750 B2 | 10/2004 | Zhang |
| 7,107,468 B2 | 9/2006 | Pullen et al. |
| 9,647,548 B2 | 5/2017 | Deboy |
| 2002/0118000 A1 | 8/2002 | Xu |
| 2006/0087295 A1 | 4/2006 | Jang et al. |
| 2009/0017426 A1 | 1/2009 | Higgins |
| 2009/0140706 A1 | 6/2009 | Taufik et al. |
| 2011/0227546 A1 | 9/2011 | Nishijima |
| 2015/0002115 A1 | 1/2015 | Shenoy et al. |
| 2015/0311792 A1 | 10/2015 | Amaro |
| 2015/0311793 A1 | 10/2015 | Khayat |
| 2016/0261190 A1 | 9/2016 | Shenoy |

FOREIGN PATENT DOCUMENTS

| | | |
|---|---|---|
| CN | 106130338 A | 11/2016 |
| TW | 201427253 A | 7/2014 |

OTHER PUBLICATIONS

PCT International Search Report and Written Opinion issued in International Application No. PCT/US2018/037447, dated Sep. 20, 2018, 14 pages.

*Primary Examiner* — Kyle J Moody
(74) *Attorney, Agent, or Firm* — Fish & Richardson P.C.

(57) ABSTRACT

An apparatus that includes first and second parallel converter branches, each parallel converter branch including an input node, N output nodes, a plurality of switches, a converter output node, and control logic. The control logic generates a first set of switch signals to control the switches of the first parallel converter branch and a second set of switch signals to control the second parallel converter branch, the first set switch signals and the second set of switch signals having respective duty cycles to cause each of the first and second parallel converter branches to output the DC output voltage on each of the N output nodes.

9 Claims, 7 Drawing Sheets

MULTI-PHASE CONVERTER

CROSS-REFERENCE TO RELATED APPLICATION

This application is a continuation application of U.S. application Ser. No. 15/675,285, filed Aug. 11, 2017, which is incorporated by reference.

BACKGROUND

Multi-phase voltage converters for converting a first DC voltage a second DC voltage are availing for a wide range of applications. Multi-phase buck converters are one example. A multi-phase buck converter outputs a lower voltage than the received input voltage. A conventional buck converter includes a switch and either a capacitor, inductor, or both. In some instances, a large step down voltage ratio makes the buck regulator inefficient. In addition, relatively high input voltages limits the switching frequency of the switches and thus sacrifices the power density as well as dynamic responses.

SUMMARY

In general, one innovative aspect of the subject matter described in this specification can be embodied in first and second parallel converter branches, each parallel converter branch includes: an input node that receives a direct current (DC) input voltage, N output nodes that each respectively output a DC output voltage, where the DC output voltage is less than the DC input voltage, and where N is two or more; a plurality of switches that each operate at a magnitude limit of substantially the DC input voltage divided by N, where each switch includes a first terminal, a second terminal, and a third terminal, and the third terminal of the first switch receives a control signal that places the first switch in either a closed state in which a conduction path is established between the first and second terminals, or an open state in which the conduction path is eliminated between the first and second terminals; a converter output node that is connected to each of the N output nodes of the first and second parallel converter branches and provides the DC output voltage; and control logic that generates a first set of switch signals to control the switches of the first parallel converter branch and a second set of switch signals to control the second parallel converter branch, the first set switch signals and the second set of switch signals having respective duty cycles to cause each of the first and second parallel converter branches to output the DC output voltage on each of the N output nodes.

Particular embodiments of the subject matter described in this specification can be implemented so as to realize one or more of the following advantages. By using multiple stacked capacitors in the multi-phase converter, the switching voltages for the MOSFETS (or other transistor types that may be used) in the circuit is reduced to a lower voltage (e.g., <5 V) than would otherwise be required without the stacked capacitors. Lowering the MOSFET switching voltage enables the capacitor stacked multi-phase voltage converter to have a higher density and efficiency relative to a traditional multi-phase buck converter. The capacitor stacked multi-phase voltage converter enables dynamic fast responses and ease of use for point of load applications and allows the use of low voltage MOSFETS for increased switching frequency.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The subject matter of this written description relates to a capacitor stacked multi-phased voltage converters that utilizes capacitors to stack voltages such that the MOSFETS operate at a smaller switching voltage. The capacitor stacked multi-phase voltage converter incorporates the benefit from both a switched capacitor converter and a buck converter. Because the capacitors reduce the switching voltage of the MOSFETS, the converter has a relatively higher efficiency and density when compared to converters that have a higher switching voltage.

These features and additional features are described in more detail below.

Figure 1:
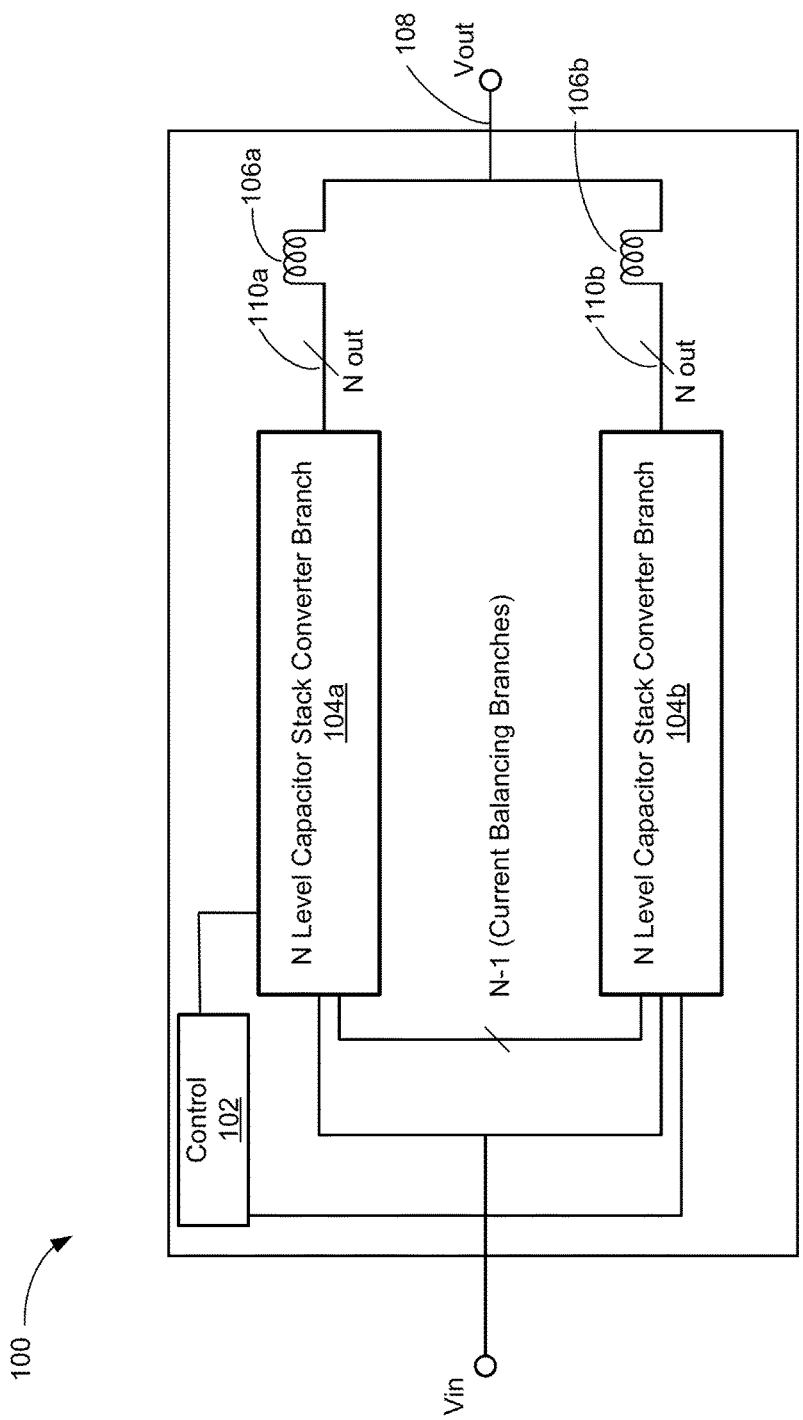
FIG. 1 is a block diagram of an example capacitor-stacked multi-phase voltage converter.

FIG. 1 is a block diagram of an example capacitor-stacked multi-phase voltage converter (CSMPVC). The voltage CSMPVC includes a control unit 102, at least two N-level capacitor stacked converter parallel branches 104*a*, 104*b*. Each parallel converter branch has an input node that receives a direct current (DC) input voltage and has N output nodes that each respectively output a DC output voltage. In some implementations, the DC output voltage is less than the DC input voltage. Inductors 106*a* and inductors 106*b* may respectively connected to each of the N output nodes. Alternatively, one inductor 106*a* may be connected to each of the output nodes of the branch 104*a*, and one inductor 106*b* may be connected to each output node of branch 104*b*.

As will be discussed in greater detail in connection with FIGS. 2, 3 and 4, each converter parallel branch includes N levels or stages. Typically, N is equal to two or more.

Each parallel converter branch 106*a*, and 106*b* also includes a plurality of switches, such as MOSFETS. Each switch includes a first terminal, a second terminal, and a third terminal, and the third terminal of the first switch receives a control signal that places the first switch in either a closed state in which a conduction path is established between the first and second terminals, or an open state in which the conduction path is eliminated between the first and second terminals. Each switch operates at a magnitude limit for the switching voltage of substantially the DC input voltage divided by N. For example, for a CSMPVC with two parallel converter branches with an input voltage of 12V, each switch operates at a switching voltage magnitude limit of no more than 6V.

In some implementations, each converter branch 104 includes N−1 cascade stages and a final stage. The N−1 cascade stages are each at an ordinal position relative to the DC input voltage and begin with a first cascade stage that is connected to the DC input voltage as a respective input voltage. Each subsequent cascade stage is connected to a previous cascade stage to receive a respective input voltage. The final stage is connected to a last cascade stage to receive a respective input voltage. Moreover, each of the N−1 cascade stages includes a stacking capacitor that is charged to approximately (N−Ord)/N of the DC input voltage, wherein the value of Ord is the ordinal position of the cascade stage relative to the DC input voltage. Accordingly, the converter may be referred to as being "capacitor stacked." The stacked capacitors are described in more detail with reference to FIGS. 2-4 below.

The CSMPVC includes a converter output node 108 that is connected to each of the N output nodes 110a, 110b of the first and second parallel converter branches and provides the DC output voltage (Vout) to a point of load.

In addition, the CSMPVC includes a controller 102 with control logic that generates a first set of switch signals to control the switches of the first parallel converter branch and a second set of switch signals to control the second parallel converter branch. The first set of switch signals and the second set of switch signals having respective duty cycles to cause each of the first and second parallel converter branches to output the DC output voltage on each of the N output nodes. The control logic can be implemented by any appropriate control circuitry that provides phased drive signals for switches.

The CSMPVC can also include N−1 current balancing branches. As will be described in greater detail in connection with FIG. 2, the N−1 current balancing branches can optionally include grounding coupling capacitors to reduce the deleterious effects of small current imbalances that may occur.

Figure 2:
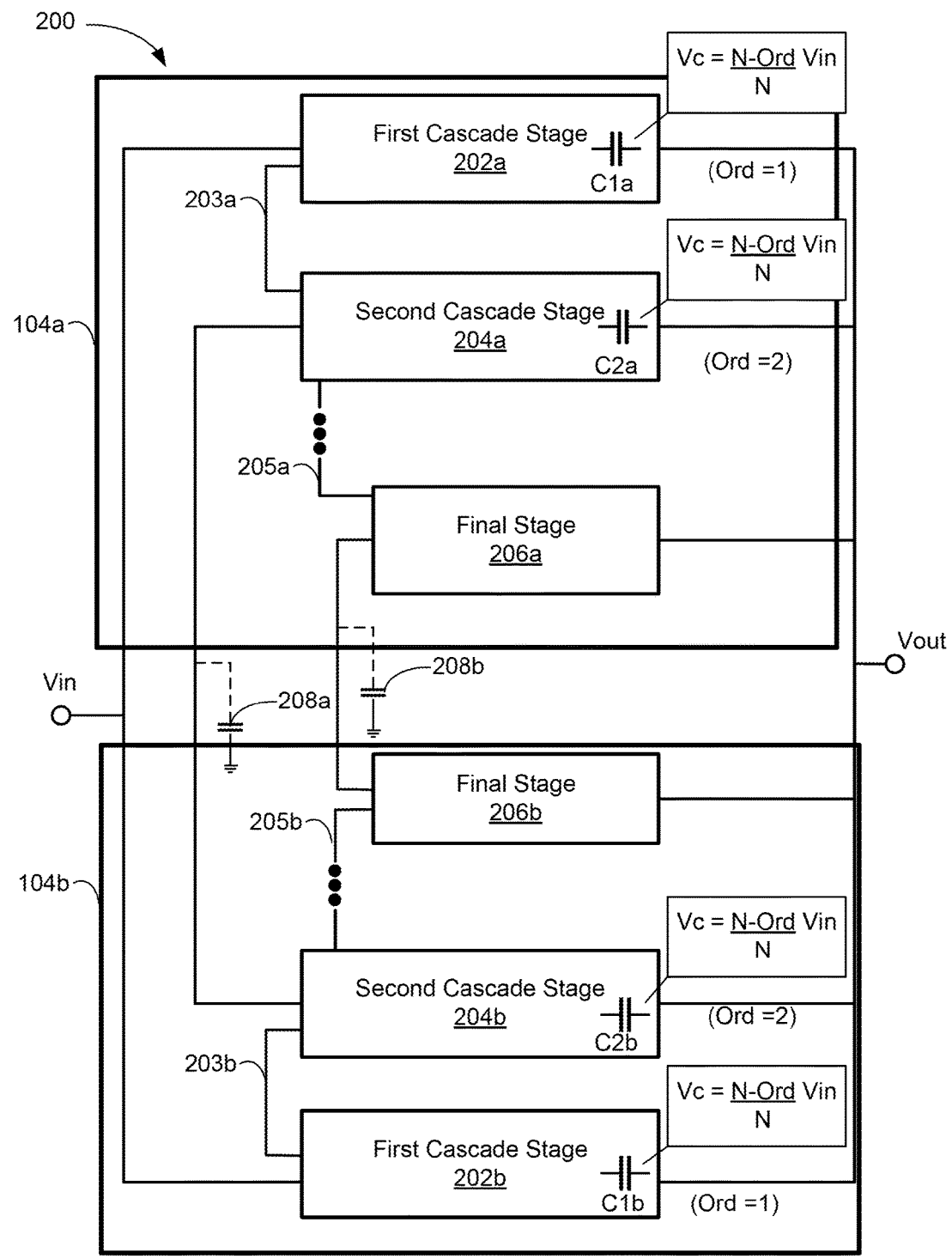
FIG. 2 is a block diagram of example parallel converter branches with cascade stages and a final stage for each converter branch.

FIG. 2 is a block diagram of example parallel converter branches 104a and 104b with cascade stages 202, 204, and a final stage 206 for each converter branch. Each parallel converter branch 104 includes N−1 cascade stages, of which two (202 and 204) are shown in each branch 104. Each cascade stage is at an ordinal position relative to the DC input voltage at the input node Vin. The first cascade stage 202, which is at ordinal position 1, is connected to the DC input voltage. Each subsequent cascade stage is connected previous cascade stage to receive a respective input voltage. For example, the second cascade stage 204, which is at ordinal position 2, is connected to cascade stage 202 by connection 203 to receive a respective input voltage. In addition, each parallel converter branch includes a final stage that is connected to a last cascade stage by a respective connection 205 to receive a respective input voltage.

Each of the N−1 cascade stages includes a stacking capacitor C, e.g., C1a for stage 202a, C2a for stage 204a, etc., that is charged to approximately (N−Ord)/N of the DC input voltage, i.e., $$Vc\_ord = Vin * (N-Ord)/N \qquad (1)$$

Where:

Vc_ord is the DC voltage across the stacked capacitor in a given cascade stage;

Vin is the input voltage;

Ord is the ordinal position of the cascade stage relative to Vin; and

N is the number of stages in the branch 104, i.e., the number of cascade stages and the final stage.

The actual voltage of the stacking capacitor will vary about the value Vc_ord due to charging and discharging during switching states, but the approximate DC value will be Vc_ord.

The utility of the stacking capacitor in each cascade stage is described with reference to FIG. 3, which is an example implementation of three level—six phase capicitatively stacked voltage converter 300. In this example, each converter branch 104 has two cascade stages 202 and 204, and a final stage 206, for three phase outputs. Because there are two branches, the circuit 300 is referred to as a three level—six phase capicitatively stacked voltage converter.

Each of the N−1 cascade stages has a similar topology. In the example circuit 300, each cascade stage 202 and 204 includes an input switch (Q1a for 202a and Q4a for 202b) that has a first terminal connected to the respective input voltage of the cascade stage. Each stage also includes a cascade coupling switch (Q3a for 202a and Q6a for 202b). In each stage, the first terminal of the coupling switch is connected to a second terminal of the input switch, and the second terminal of the coupling switch connected to a first terminal of an input switch of a subsequent cascade stage or the final stage. For example, as shown in FIG. 3, in cascade stage 202a, the cascade coupling switch Q3a connects the second terminal of the input switch Q1a of the cascade stage 201a to the first terminal of the input switch Q4a of the cascade stage 204a. Accordingly, the second terminal of the cascade coupling switch Q3a of the cascade stage 202a provides the respective input voltage for the cascade stage 204a. A similar arrangement is implemented in the cascade stages 202b and 204b. Were there addition cascade stages, they would also be connected in a similar manner.

Each cascade stage also has a stacking capacitor that has a first terminal connected to the second terminal of the input switch and a second terminal connected to a node that includes a first terminal of a ground switch and a first terminal of an output inductor. For example, cascade stage 202a includes the stacking capacitor C1a that is connected to the second terminal of the input switch Q1a and to a node that connects to a first terminal of a ground switch Q2a and a first terminal of an output inductor L1a. Cascade stages 204a, 202b and 206b are constructed in a like manner.

Finally, each branch 104 has a final stage 206. The final stage includes an input switch with a first terminal connected to a second terminal of a cascade coupling switch, and an output inductor with a first terminal connected to a second terminal of the input switch, and a second terminal coupled to an output node. Additionally, a ground switch has a first terminal connected to the second terminal of the input switch, and a second terminal connected to the ground. For example, as shown in FIG. 3, the input switch is Q7a, the ground switch is Q8a, and the output inductor is L3a. The second terminal of each inductor L is connected to a common node to provide an output voltage Vout.

In some implementations, for a first converter branch, each first terminal of the input switch of each subsequent cascade stage and final stage is respectively connected to each first terminal of each input switch of each subsequent cascade stage and final stage of the second converter branch. This is to facilitate current balancing during switching. For example, the first terminal of Q4a is connected to the first terminal of Q4b, and the first terminal of Q7a is connected to the first terminal of Q7b. Coupling capacitors C3 and C4, which are shown in phantom, are optional and may be used if the phase shift between voltages in the branches is such that the currents do not balance.

The stacking capacitors C1a and C2a allow a switching voltage for each input switch Q1a and Q4a of each stage to be reduced to a level of 1/N of the DC input voltage. Likewise, the stacking capacitors C1B and C2b allow the switching voltage for each input switch Q1b and Q6b to be reduced to the level of 1/N of the DC input voltage. Moreover, because the input switches only switch up to 1/N of the input voltage Vin, each stacking capacitor in a subsequent stage has its respective input voltage load reduced by 1/N. This monotonically decreasing load on the capacitors thus results in the final stage only needing to switch 1/N of the input voltage Vin, and thus the final stage does not require a stacking capacitor. Such reduction of the switch voltage for the switches in each stage enables the switches to be implemented with higher switching frequencies and at higher a density than if the switches had to switch a larger portion of the input voltage.

The final stage 206 of each of the converter parallel branch 104 includes an input switch having a first terminal connected to a second terminal of a cascade coupling switch. The final stage also includes output inductor and a ground switch. The output inductor has a first terminal connected to a second terminal of the input switch and a second terminal coupled to the output node. The ground switch has a first terminal connected to the second terminal of the input switch and a second terminal connected to the ground. However, because the final stage does not couple to another subsequent stage, and does not need a stacking capacitor, the final stage 206 does not have a stacking capacitor nor a cascade coupling switch.

Figure 3:
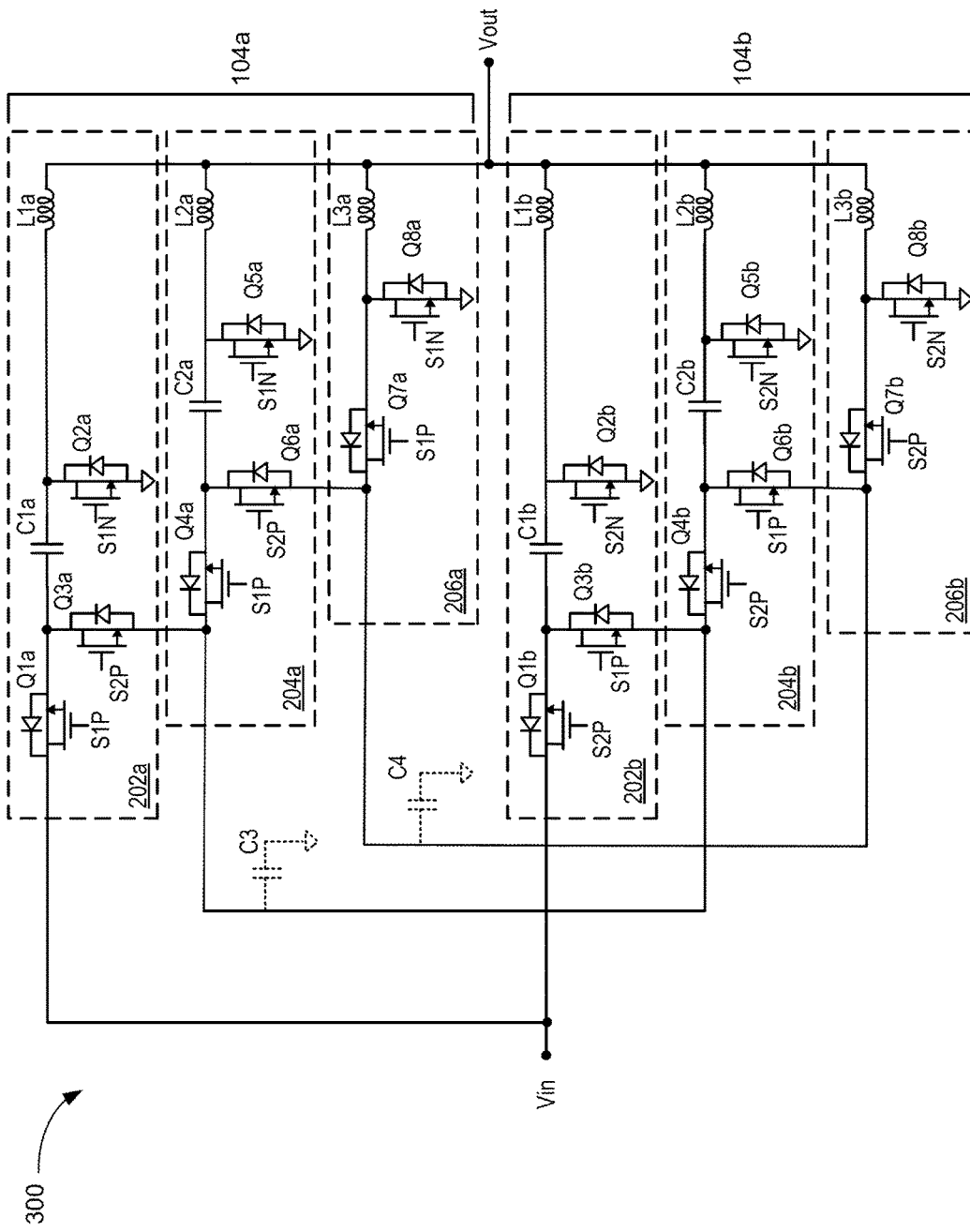
FIG. 3 is an example implementation of a three level—six phase capacitively stacked voltage converter.

For example, as shown in FIG. 3, the final stage 206a has the input switch Q7a, the inductor L3a, and the ground switch Q8a. Likewise, the final stage 206b has the input switch Q7b, the inductor L3b, and the ground switch Q8b.

Operation of an example multi-phase converter is described with reference to FIGS. 4, 5 and 6. The operation and function of the elements components of FIG. 4 are similar to the operation and function of the elements components as described with reference to FIG. 3 above, except that FIG. 4 is a two level-four phase capacitively stacked voltage converter 400 (i.e., N=2). Here there is only a single cascade stage 402 and a final stage 404 in each branch 404. For each cascade branch 104, the input switch is Q1, the ground switch is Q2, cascade coupling switch is Q3, the output inductor is L1, and the stacking capacitor is C1. For each final stage 404, the input switch is Q4, the grounding switch is Q5, and the output inductor is L2. According to equation (1) above, each stacked capacitor C1 will charge to a voltage of approximately Vin*(2−1)/2, or Vin/2. Accordingly, each transistor Q will switch at no more than Vin/2.

Figure 5:
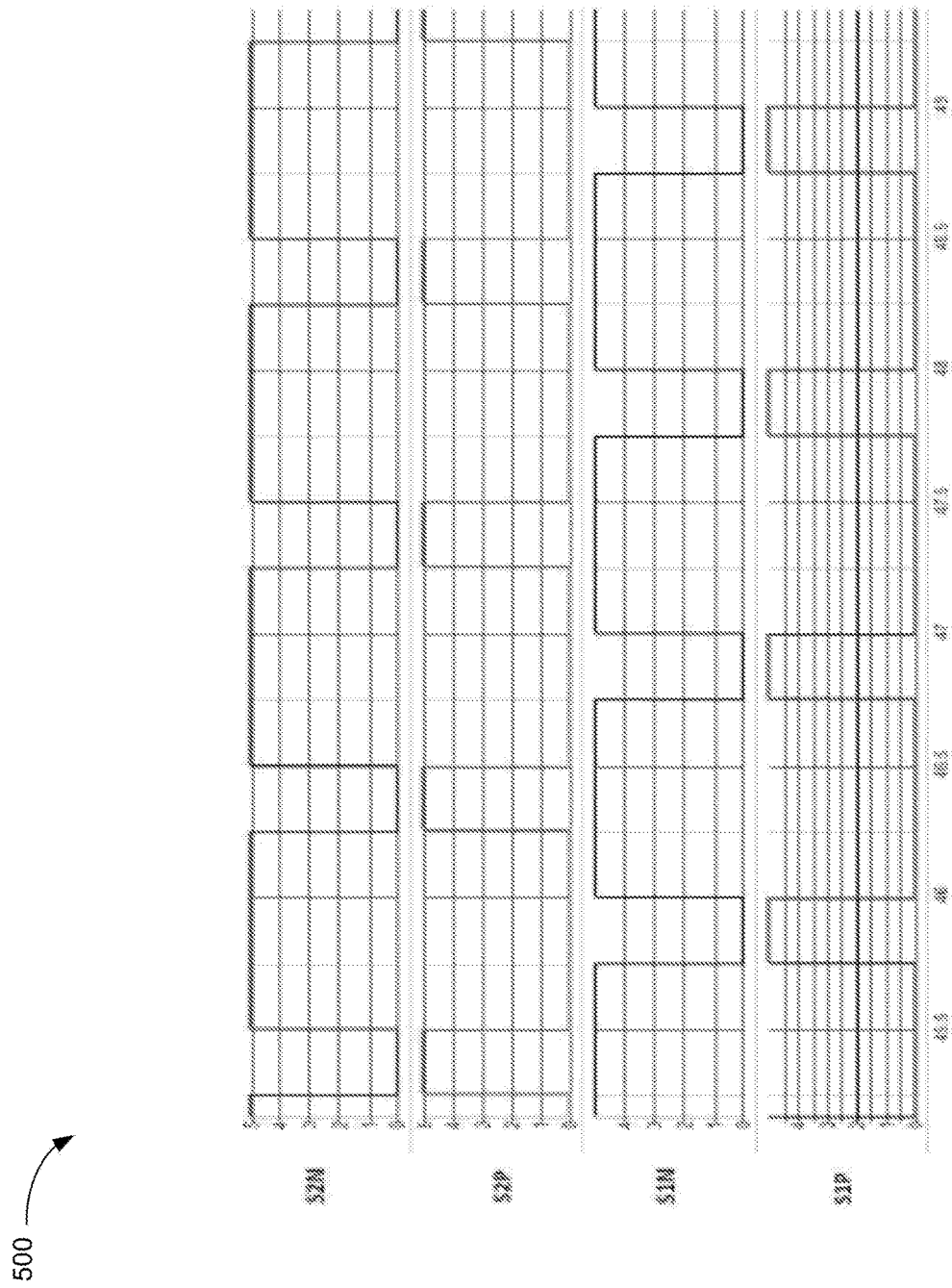
FIG. 5 is a diagram of pulse width modulated control waveforms of the two level—four phase capacitively stacked voltage converter.

FIG. 5 is a diagram 500 of pulse width modulated control waveforms of the two level—four phase capacitively stacked voltage converter. In this example, Vin=8V, Vout=1V, the switching frequency is 1 MHz, I out=100 A, and the duty cycle is 0.25. In this implementation, the CSMPVC does not utilize any coupling capacitors. In addition, the control signals S1P and S2P are 180 degrees phase shifted, and the control signals 1N and S2N are 180 degrees phase shifted.

Figure 6:
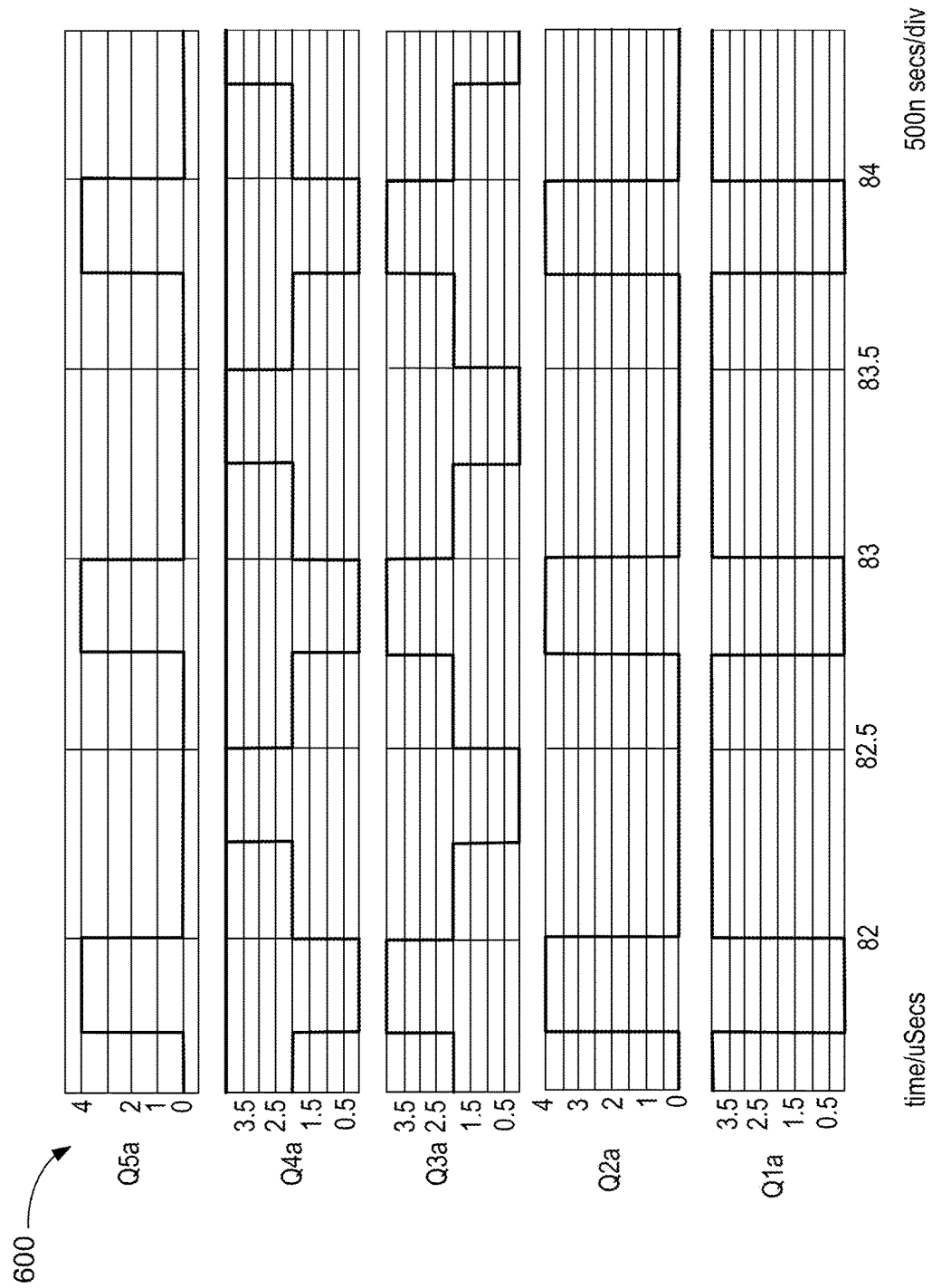
FIG. 6 is a diagram of switch node waveforms of the two level—four phase capacitively stacked voltage converter.

FIG. 6 is a diagram 600 of switch node waveforms of the two level—four phase capacitively stacked voltage converter. Only the switched voltages for Q1a-Q5a are illustrated. Because Vin=8V, all switches are switching at approximately no more than 4V. This enables the CSMPVC to leverage the use of MOSFET technology enabling high density and high efficiency.

Figure 4:
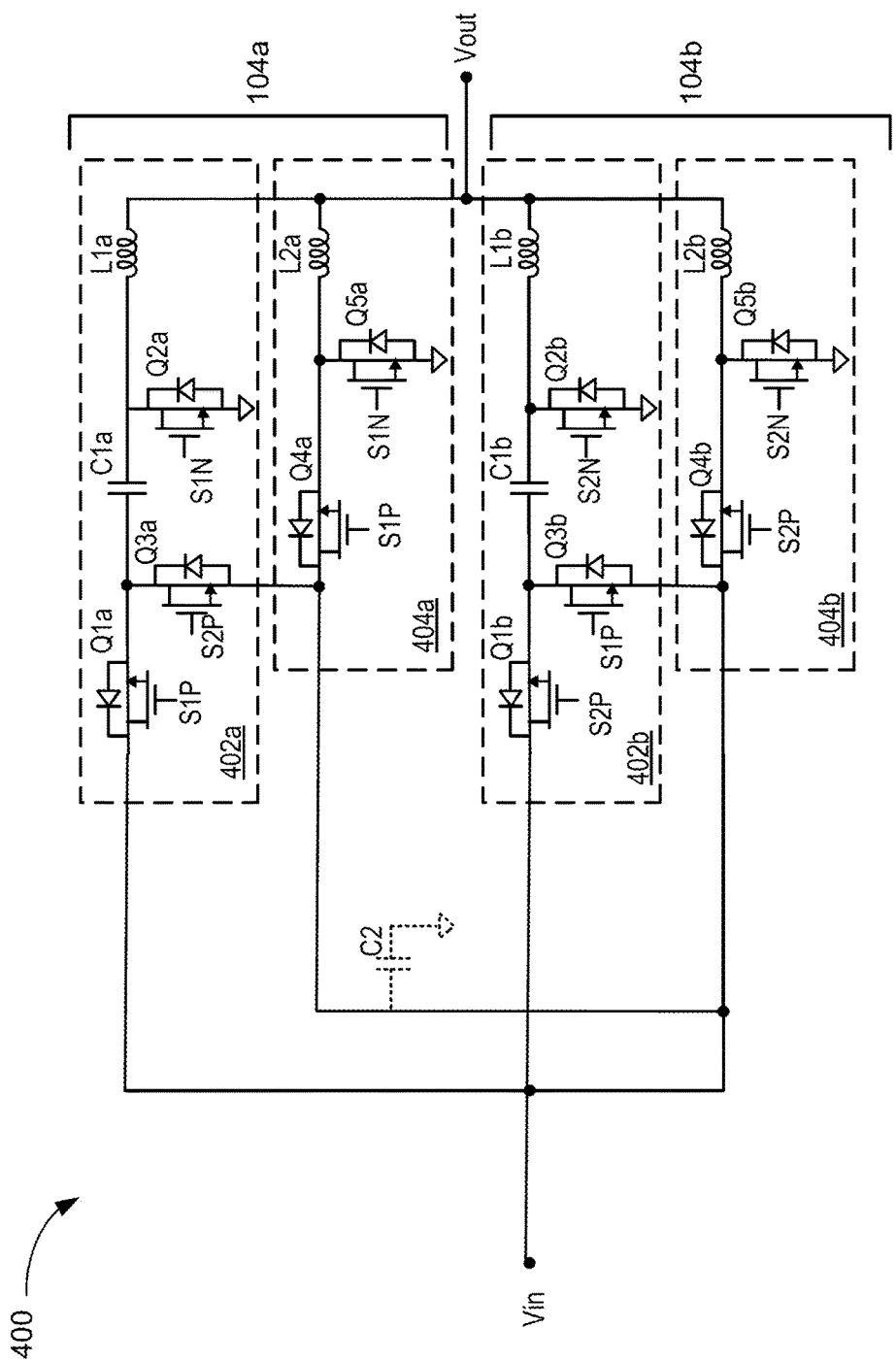
FIG. 4 is an example implementation of a two level—four phase capacitively stacked voltage converter.
Figure 7:
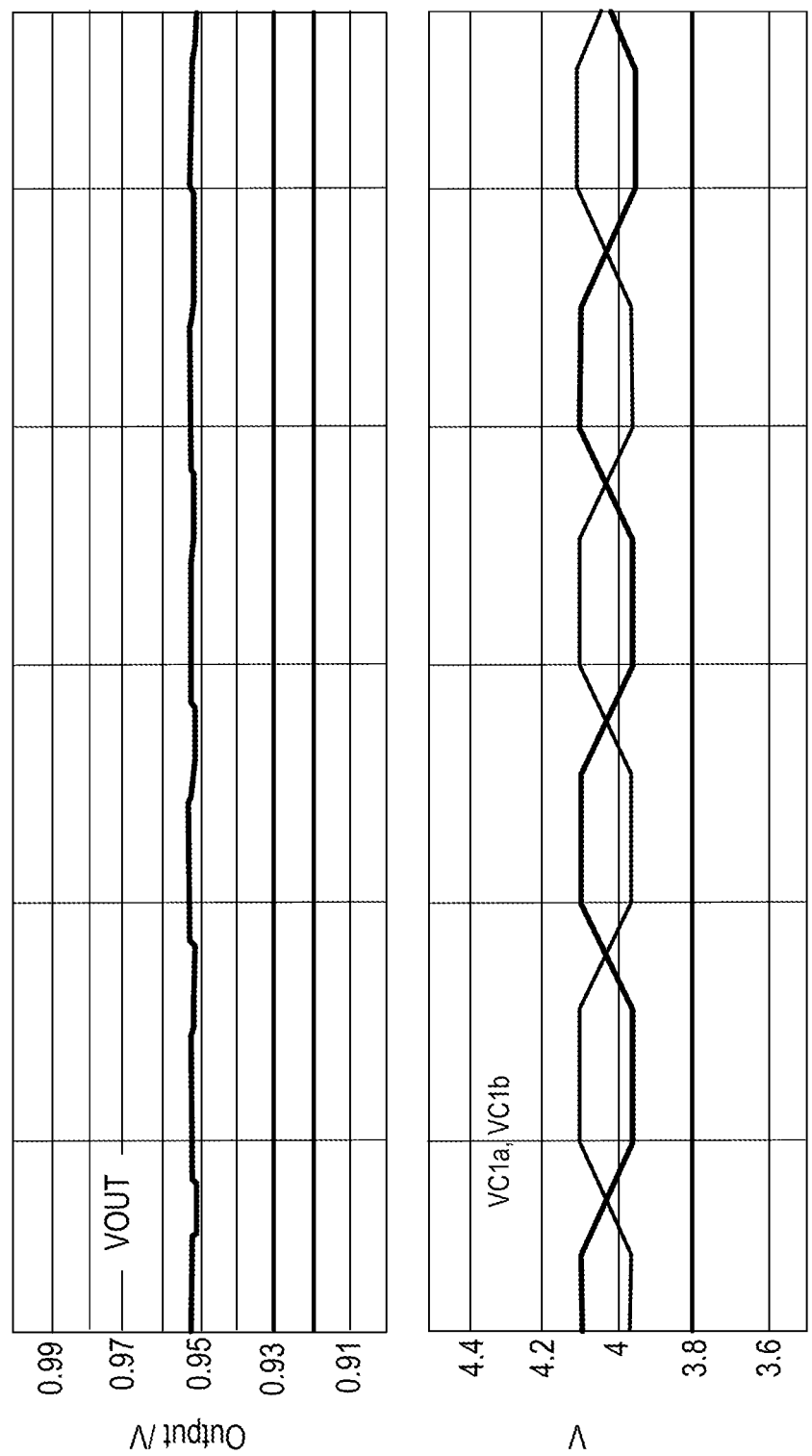
FIG. 7 is a diagram of an output voltage and stacked capacitor voltages for the circuit of FIG. 4.

FIG. 7 is a diagram 700 of an output voltage and stacked capacitor voltages for the circuit of FIG. 4. As described above, the actual voltage of the stacking capacitor will vary about the value Vc_ord (here, 4V) due to charging and discharging during switching states, but the approximate DC value will be approximately 4V.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus, comprising:
   first and second parallel converter branches, each parallel converter branch comprising:
   an input node that receives a direct current (DC) input voltage;
   N output nodes that each respectively output a DC output voltage, wherein the DC output voltage is less than the DC input voltage, wherein N is an integer with a value of two or more;
   a plurality of switches, wherein each switch comprises a first terminal, a second terminal, and a third terminal, and the third terminal of the first switch receives a control signal that places the first switch in either a closed state in which a conduction path is established between the first and second terminals, or an open state in which the conduction path is eliminated between the first and second terminals;
   N−1 cascade stages, each having an ordinal position relative to the DC input voltage and beginning with a first cascade stage that is connected to the DC input voltage as a respective input voltage, and each subsequent cascade stage is connected to a previous cascade stage to receive a respective input voltage, wherein each of the N−1 cascade stages includes a stacking capacitor that is charged to a value based on its ordinal position of the cascade stage relative to the DC input voltage; and
  a final stage that is connected to a last cascade stage to receive a respective input voltage;
a converter output node that is connected to each of the N output nodes of the first and second parallel converter branches and provides the DC output voltage; and
control logic that generates a first set of switch signals to control the switches of the first parallel converter branch and a second set of switch signals to control the second parallel converter branch, the first set switch signals and the second set of switch signals having respective duty cycles to cause each of the first and second parallel converter branches to output the DC output voltage on each of the N output nodes.

2. The apparatus of claim 1, wherein each of the N−1 cascade stages includes:
  an input switch having a first terminal connected to the respective input voltage of the cascade stage;
  a cascade coupling switch having a first terminal connected to a second terminal of the input switch, and a second terminal connected to a respective subsequent cascade stage or the final stage; and
  a stacking capacitor having a first terminal connected to the second terminal of the input switch and a second terminal connected to a first terminal of a ground switch and a first terminal of an output inductor;
  wherein the ground switch has a second terminal connected to a ground and the output inductor has a second terminal connected to the output node.

3. The apparatus of claim 2, wherein the final stage comprises:
  an input switch having a first terminal connected to a second terminal of a cascade coupling switch;
  an output inductor having a first terminal connected to a second terminal of the input switch, and a second terminal coupled to the output node; and
  a ground switch having a first terminal connected to the second terminal of the input switch, and a second terminal connected to the ground.

4. The apparatus of claim 3, wherein each first terminal of the input switch of each subsequent cascade stage and final stage of the first parallel converter branch is respectively connected to each first terminal of each input switch of each subsequent cascade stage and final stage of the second parallel converter branch.

5. The apparatus of claim 4, wherein the first set of switch signals and the second set of switch signals are 180 degrees out of phase with respect to each other.

6. The apparatus of claim 4, wherein:
  each first terminal of the input switch of each subsequent cascade stage and final stage of the first parallel converter branch are respectively connected to the first terminal of each input switch of each subsequent cascade stage and final stage of the second parallel converter branch is coupled to ground by a respective coupling capacitor; and
  the first set of switch signals and the second set of switch signals are less than 180 degrees out of phase with respect to each other.

7. The apparatus of claim 1, wherein each respective input voltage of each subsequent cascade stage and final stage of the first parallel converter branch is respectively connected to each respective input voltage of each subsequent cascade stage and final stage of the second parallel converter branch.

8. The apparatus of claim 1, wherein the first set of switch signals and the second set of switch signals are 180 degrees out of phase with respect to each other.

9. The apparatus of claim 8, wherein:
  each respective input voltage of each subsequent cascade stage and final stage of the first parallel converter branch and respectively connected input voltage of each subsequent cascade stage and final stage of the second parallel converter branch is coupled to ground by a respective coupling capacitor; and
  the first set of switch signals and the second set of switch signals are less than 180 degrees out of phase with respect to each other.

* * * * *